United States Patent
Yang et al.

(10) Patent No.: US 8,562,164 B2
(45) Date of Patent: Oct. 22, 2013

(54) EDGE-TYPE BACKLIGHT MODULE

(75) Inventors: Chan-Shung Yang, Kaohsiung (TW); Su-Yi Lin, Taipei County (TW)

(73) Assignee: Au Optronics Corporation, Hsinchu (TW)

( * ) Notice: Subject to any disclaimer, the term of this patent is extended or adjusted under 35 U.S.C. 154(b) by 334 days.

(21) Appl. No.: 12/957,403

(22) Filed: Dec. 1, 2010

(65) Prior Publication Data

US 2012/0081918 A1     Apr. 5, 2012

(30) Foreign Application Priority Data

Oct. 4, 2010   (TW) ................................ 99133746 A

(51) Int. Cl.
*F21V 7/04*     (2006.01)
(52) U.S. Cl.
USPC .................. 362/97.3; 362/97.1; 362/97.2
(58) Field of Classification Search
USPC ......... 362/600, 612, 615, 631, 632, 633, 634, 362/97.1–97.4
See application file for complete search history.

(56) References Cited

U.S. PATENT DOCUMENTS

| 7,586,126 | B2 | 9/2009 | Yang et al. | |
| 7,670,019 | B2 * | 3/2010 | Kang | 362/97.1 |
| 8,047,668 | B2 * | 11/2011 | Chang et al. | 362/97.1 |
| 2004/0257791 | A1 * | 12/2004 | Chen et al. | 362/31 |
| 2007/0064444 | A1 * | 3/2007 | Kim et al. | 362/612 |

FOREIGN PATENT DOCUMENTS

| CN | 2653542 | 11/2004 |
| CN | 1862335 A | 11/2006 |
| CN | 1877417 | 12/2006 |
| CN | 201606759 U | 10/2010 |
| JP | 2004-117413 | 4/2004 |
| JP | 2004-117452 | 4/2004 |
| JP | 2004-319164 | 11/2004 |
| TW | 200835967 | 9/2008 |

OTHER PUBLICATIONS

"First Office Action of China Counterpart Application", issued on Dec. 7, 2011, p. 1-p. 5.

* cited by examiner

*Primary Examiner* — Evan Dzierzynski
*Assistant Examiner* — Danielle Allen
(74) *Attorney, Agent, or Firm* — Jianq Chyun IP Office

(57) ABSTRACT

An edge-type backlight module includes a back bezel, a light guide plate (LGP), a light source, and a frame. The back bezel includes a supporting portion that has a light source supporting surface and an LGP supporting surface. A horizontal level of the light source supporting surface is lower than that of the LGP supporting surface. The LGP is configured on the LGP supporting surface and has a light-incident side surface and a top light-emitting surface. The light source is configured on the light source supporting surface to provide a light beam. The frame is configured on the back bezel and leans against the LGP. The frame has a reflective surface located on a transmission path of the light beam to reflect the light beam, and the reflected light beam enters the LGP from the light-incident side surface.

12 Claims, 5 Drawing Sheets

EDGE-TYPE BACKLIGHT MODULE

CROSS-REFERENCE TO RELATED APPLICATION

This application claims the priority benefit of Taiwan application serial no. 99133746, filed on Oct. 4, 2010. The entirety of the above-mentioned patent application is hereby incorporated by reference herein and made a part of this specification.

BACKGROUND OF THE INVENTION

1. Field of the Invention

The invention relates to a backlight module. More particularly, the invention relates to an edge-type backlight module.

2. Description of Related Art

In recent years, liquid crystal displays (LCDs) that have been developed toward full-color display gradually replace a conventional cathode ray tube (CRT) display and have become a main stream of displays in the market due to the advantages of a low operation voltage, non-radiation, light weight, small volume occupancy, and so forth. The LCDs are non-self-illuminating displays, and therefore display functions of the LCDs are achieved when required light is provided by a backlight module. With increasing consciousness of environmental protection, cold cathode fluorescent lamps (CCFLs) serving as light-emitting devices in a conventional backlight module are gradually replaced by light-emitting diode (LED) devices because the LED devices are more friendly to environment. When the LED devices are applied in the backlight module, e.g., an edge-type backlight module, the LED devices are usually mounted on a bar-shaped printed circuit board (PCB) to form an LED light bar. The LED light bar is often electrically connected to a control circuit board through a flexible printed circuit (FPC).

FIG. 1 is a schematic top view illustrating a conventional edge-type backlight module. FIG. 2A and FIG. 2B are schematic cross-sectional views illustrating different types of conventional edge-type backlight modules. With reference to FIG. 1 and FIG. 2A, the conventional edge-type backlight module 100 includes a light guide plate (LGP) 110, a light source 120, a frame 130, and a back bezel 140. The LGP 110 is configured on the back bezel 140. Besides, the LGP 110 has a top light-emitting surface 112 and a light-incident side surface 114 connected to the top light-emitting surface 112. The top light-emitting surface 112 includes an effective illumination region 112b and a peripheral region 112a that is connected to the light-incident side surface 114.

It can be learned from FIG. 1 and FIG. 2A that the light source 120 is configured next to the light-incident side surface 114 to provide a light beam L. The light source 120 includes a circuit board 122 and a plurality of side-view LED devices 124. Each of the side-view LED devices 124 is configured on and electrically connected to the circuit board 122. That is to say, the light source 120 is a side-view LED light bar.

As shown in FIG. 1, a pitch between any two adjacent LED devices 124 of the conventional light source 120 is P, and the shortest light path from the light-emitting surface of each of the LED devices 124 to the edge of the effective illumination region 112b is A. In order to uniformize the luminance of the effective illumination region 112b, users determine the optimal A/P ratio based on the divergence angle of the light beam L of the LED devices 124. However, the LCD has been developed to comply with the requirement for the slim border design, and therefore the shortest light path A from the light-incident surface of each of the LED devices 124 to the edge of the effective illumination region 112b needs to be further shortened. When the A/P ratio is overly low, dark and bright hot spots are generated at the effective illumination region 112b close to the light-incident side surface 114. The dark regions shown in FIG. 1 refer to regions with low luminance. The hot spots can be removed by shortening the pitches P, while more of the LED devices 124 are required when the pitches P are shortened. As such, manufacturing costs are increased. Apparently, the edge-type backlight module 100 depicted in FIG. 2A cannot be designed in consideration of both the A/P ratio and the manufacturing costs.

With reference to FIG. 2B, a top-view LED light bar serves as the light source 120 of the edge-type backlight module 100'. Specifically, the light source 120 includes a circuit board 122 and a plurality of top-view LED devices 124'. Each of the top-view LED devices 124' is configured on and electrically connected to the circuit board 122. To further improve heat dissipation efficiency of the top-view LED devices 124', a heat sink HS is frequently employed to dissipate heat generated by the top-view LED devices 124'.

Based on the above, in the edge-type backlight modules 100 and 100' respectively depicted in FIG. 2A and FIG. 2B, a width W (which is usually referred to as the distance from the edge of the effective illumination region 112b to the edge of the edge-type backlight modules 100 and 100') of the frame is closely related to the A/P ratio. That is to say, the shortest light path A from the light-emitting surface of each of the LED devices 124 to the edge of the effective illumination region 112b is directly subject to the width W of the frame. Accordingly, how to increase the A/P ratio in compliance with the requirement for slim border design without significantly increasing the manufacturing costs becomes an important issue to be resolved.

SUMMARY OF THE INVENTION

The invention is directed to an edge-type backlight module adapted to an LCD with a slim border design.

The invention provides an edge-type backlight module that includes a back bezel, a light guide plate (LGP), a light source, and a frame. The back bezel includes a supporting portion that has a light source supporting surface and an LGP supporting surface. A horizontal level of the light source supporting surface is lower than that of the LGP supporting surface. The LGP is configured on the LGP supporting surface and has a light-incident side surface. The light source is configured on the light source supporting surface to provide a light beam. The frame is configured on the back bezel and leans against the LGP. Besides, the frame has a reflective surface located on a transmission path of the light beam to reflect the light beam, and the reflected light beam enters the LGP from the light-incident side surface.

According to an embodiment of the invention, a difference between the horizontal level of the light source supporting surface and the horizontal level of the LGP supporting surface ranges from about 3 millimeters to about 10 millimeters.

According to an embodiment of the invention, the LGP further has a top light-emitting surface and a scattering surface opposite to the top light-emitting surface.

According to an embodiment of the invention, the horizontal level of the LGP supporting surface is between the horizontal level of the light source supporting surface and a horizontal level of the top light-emitting surface.

According to an embodiment of the invention, the light source includes an LED light bar.

According to an embodiment of the invention, the LED light bar includes a circuit board and a plurality of LED devices. The circuit board is configured on the light source supporting surface and has a device-mounting surface. The LED devices are configured on the device-mounting surface, and optical axes of the LED devices point at the reflective surface.

According to an embodiment of the invention, an accommodation space is surrounded by the reflective surface of the frame, the light source supporting surface, and the light-incident side surface of the LGP. The light source is located within the accommodation space and below the reflective surface.

According to an embodiment of the invention, the reflective surface is a plane or a cambered surface.

According to an embodiment of the invention, an included angle $\theta1$ between the reflective surface and the light-incident side surface ranges from about 15° to about 75°.

According to an embodiment of the invention, an included angle $\theta2$ between the reflective surface and the light source supporting surface ranges from about 15° to about 75°.

According to an embodiment of the invention, the light-incident side surface is substantially perpendicular to the light source supporting surface.

According to an embodiment of the invention, the back bezel further includes a side leaning portion. The side leaning portion is connected to the supporting portion, and the frame leans against the side leaning portion of the back bezel.

In this invention, the horizontal level of the light source supporting surface is lower than the horizontal level of the LGP supporting surface, so as to extend the shortest light path A from the light-incident surface of each of the LED devices to the edge of the effective illumination region. When the design concept of this invention is applied to the LCD with the slim border design, the requirement for the slim border design can be satisfied, and the A/P ratio can be effectively increased.

In order to make the aforementioned and other features and advantages of the invention comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF EMBODIMENTS

Figure 3:
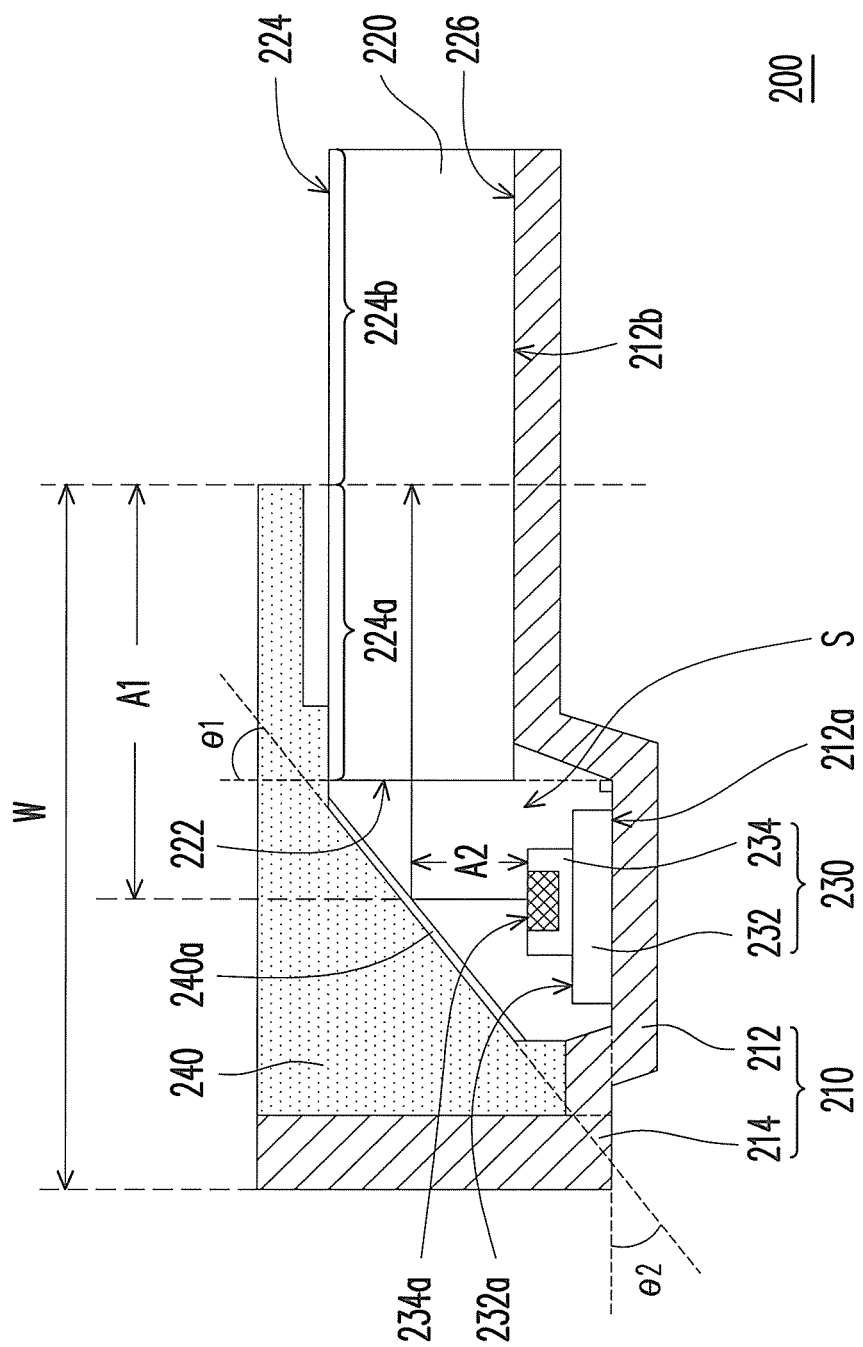
FIG. 3 is a schematic cross-sectional view illustrating an edge-type backlight module according to an embodiment of the invention.

FIG. 3 is a schematic cross-sectional view illustrating an edge-type backlight module according to an embodiment of the invention. With reference to FIG. 3, the edge-type backlight module 200 of this embodiment includes a back bezel 210, an LGP 220, a light source 230, and a frame 240. The back bezel 210 includes a supporting portion 212 that has a light source supporting surface 212a and an LGP supporting surface 212b. A horizontal level of the light source supporting surface 212a is lower than that of the LGP supporting surface 212b. The LGP 220 is configured on the LGP supporting surface 212b and has a light-incident side surface 222. The light source 230 is configured on the light source supporting surface 212a to provide a light beam L. The frame 240 is configured on the back bezel 210 and leans against the LGP 220. The frame 240 has a reflective surface 240a located on a transmission path of the light beam L to reflect the light beam L, and the reflected light beam L enters the LGP 220 from the light-incident side surface 222.

In this embodiment, the light source supporting surface 212a and the LGP supporting surface 212b having different horizontal levels can be formed by performing a proper molding process on the back bezel 210. Besides, a material of the back bezel 210 is, for instance, aluminum, steel electrogalvanized cold-rolled coil (SECC), and so forth. For instance, the difference between the horizontal level of the light source supporting surface 212a and the horizontal level of the LGP supporting surface 212b ranges from about 3 millimeters to about 10 millimeters. The greater the difference between the horizontal level of the light source supporting surface 212a and the horizontal level of the LGP supporting surface 212b, the larger the distance A2 between the reflective surface 240a and the light source 230. Hence, the horizontal level of the light source supporting surface 212a and the horizontal level of the LGP supporting surface 212b can be adjusted, so as to ensure the distance A2 is desirable.

It can be observed from FIG. 3 that the LGP 220 has not only the light-incident side surface 222 but also a top light-emitting surface 224 and a scattering surface 226 opposite to the top light-emitting surface 224. In addition, the top light-emitting surface 224 includes an effective illumination region 224b and a peripheral region 224a that is connected to the light-incident side surface 222. For instance, the scattering surface 226 is in contact with the LGP supporting surface 212b and often has mesh points or V-shaped grooves that are conducive to scattering the light beam L. According to this embodiment, the horizontal level of the LGP supporting surface 212b is between the horizontal level of the light source supporting surface 212a and a horizontal level of the top light-emitting surface 224. That is to say, the back bezel 210 has a portion that supports the light source 230, and the portion has the down-set design. The down-set design slightly increases the thickness of the edge-type backlight module 200 and significantly increases the distance A2.

In this embodiment, the light source 230 includes an LED light bar, and the LED light bar is a top-view LED light bar, for example. Specifically, the LED light bar 230 includes a circuit board 232 and a plurality of LED devices 234. The circuit board 232 is configured on the light source supporting surface 212a of the back bezel 210 and has a device-mounting surface 232a. The LED devices 234 are configured on the device-mounting surface 232a of the circuit board 232, and optical axes of the LED devices 234 point at the reflective surface 240a. Here, the distance A2 refers to the distance from the light-incident surface 234a of each of the LED devices 234 to the reflective surface 240a. The distance A2 is affected not only by the difference between the horizontal level of the light source supporting surface 212a and the horizontal level of the LGP supporting surface 212b but also by the location and the angle of the reflective surface 240a. For instance, an included angle $\theta1$ between the reflective surface 240a and the light-incident side surface 222 ranges from about 15° to about 75°. An included angle $\theta2$ between the reflective surface 240a and the light source supporting surface 212a ranges from about 15° to about 75°. Besides, the light-incident side surface 222 is substantially perpendicular to the light source supporting surface 212a.

It can be observed from FIG. 3 that the reflective surface 240a of this embodiment is a plane, for instance. An accommodation space S is surrounded by the reflective surface 240a of the frame 240, the light source supporting surface 212a, and the light-incident side surface 222 of the LGP 220. The light source 230 is located within the accommodation space S and below the reflective surface 240a. For instance, the reflective surface 240a is a reflective coating film coated onto the surface of the frame 240 or a reflective film adhered to the surface of the frame 240.

In this embodiment, the back bezel 210 not only has the supporting portion 212 but also includes a side leaning portion 214. The side leaning portion 214 is connected to the supporting portion 212, and the frame 240 leans against the side leaning portion 214 and the supporting portion 212 of the back bezel 210. In general, to fix the relative positions of the back bezel 210, the frame 240, and the LGP 220, a front bezel (not shown) can be assembled to the back bezel 210, such that the frame 240 and the LGP 220 can be fixed between the front bezel and the back bezel 210.

Figure 1:
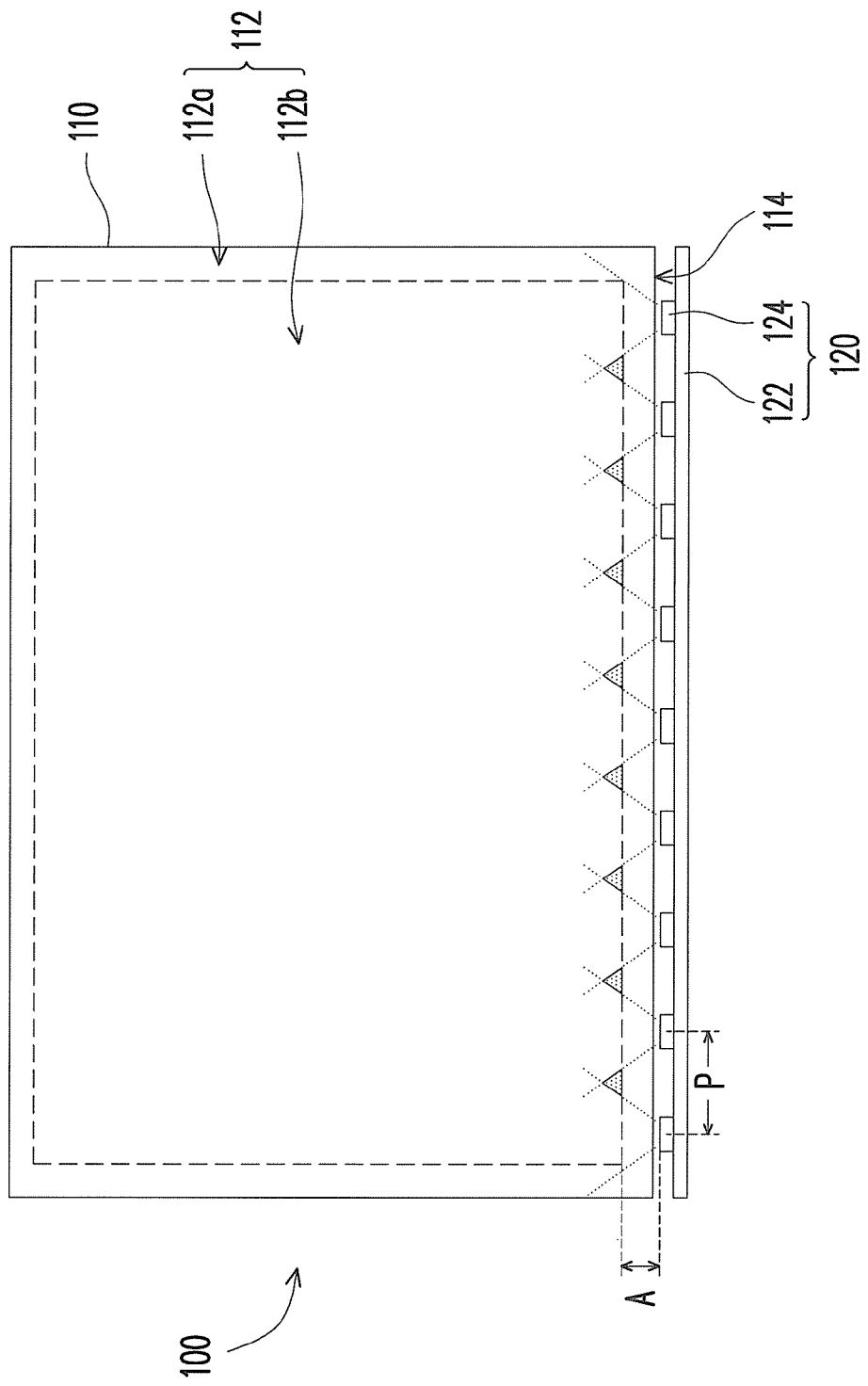
FIG. 1 is a schematic top view illustrating a conventional edge-type backlight module.
Figure 2A:
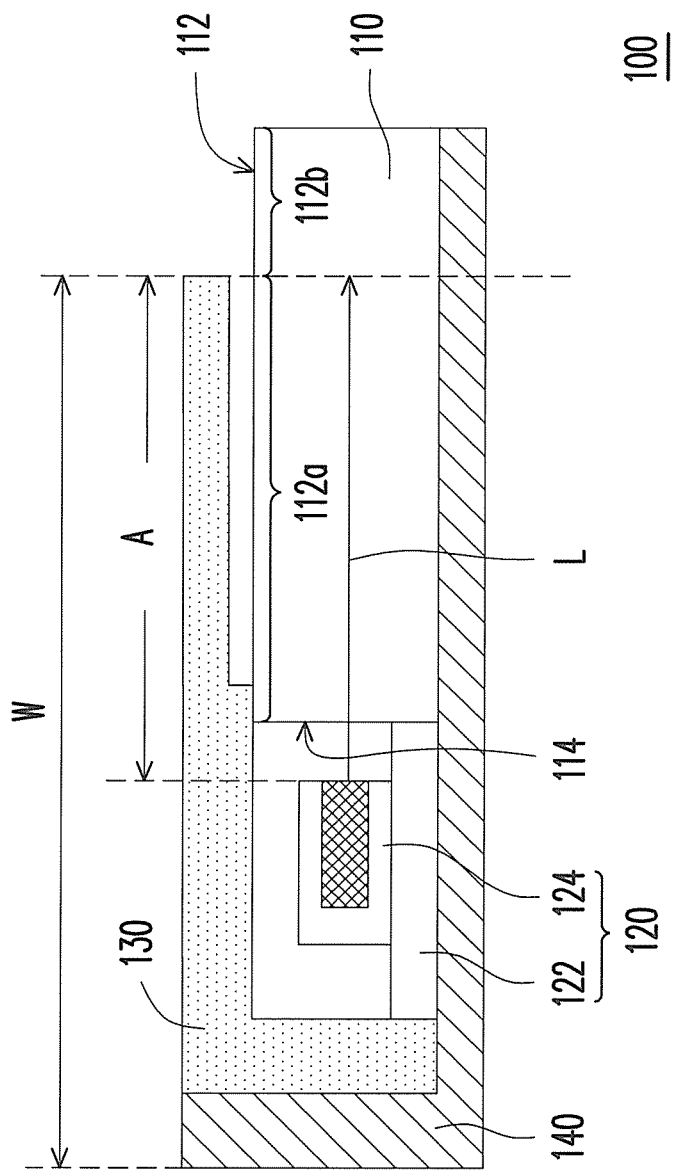
FIG. 2A and FIG. 2B are schematic cross-sectional views illustrating different types of conventional edge-type backlight modules.
Figure 2B:
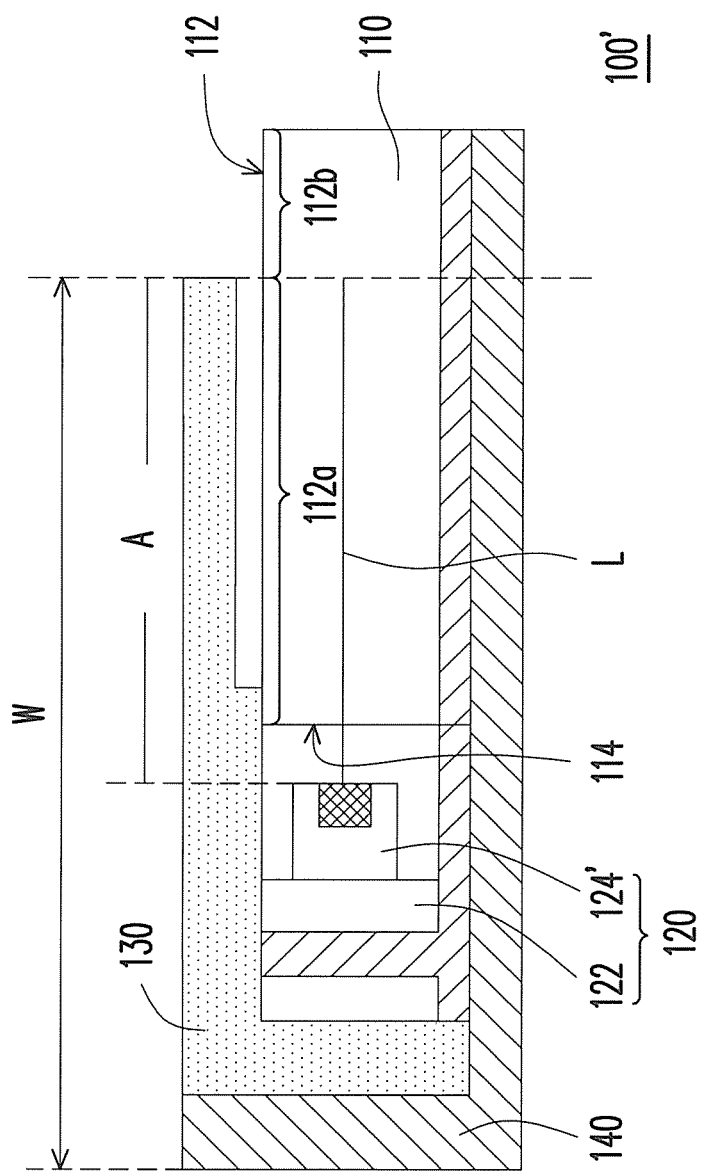

With reference to FIG. 1 and FIG. 3, in the edge-type backlight module 200 of this embodiment, the shortest light path A from the light-incident surface 234a of the LED device 234 to the edge of the effective illumination region 224b is the total of the distance A1 and the distance A2. The width W (which is usually referred to as the distance from the edge of the effective illumination region 224b to the edge of the edge-type backlight module 200) of the frame 240 is merely related to the distance A1. Therefore, the shortest light path A can be increased by increasing the distance A2 according to this embodiment. As such, the edge-type backlight module 200 of this embodiment can satisfy the requirement for the slim border design, and the A/P ratio can be optimized. Here, P refers to the pitches depicted in FIG. 1.

Figure 4:
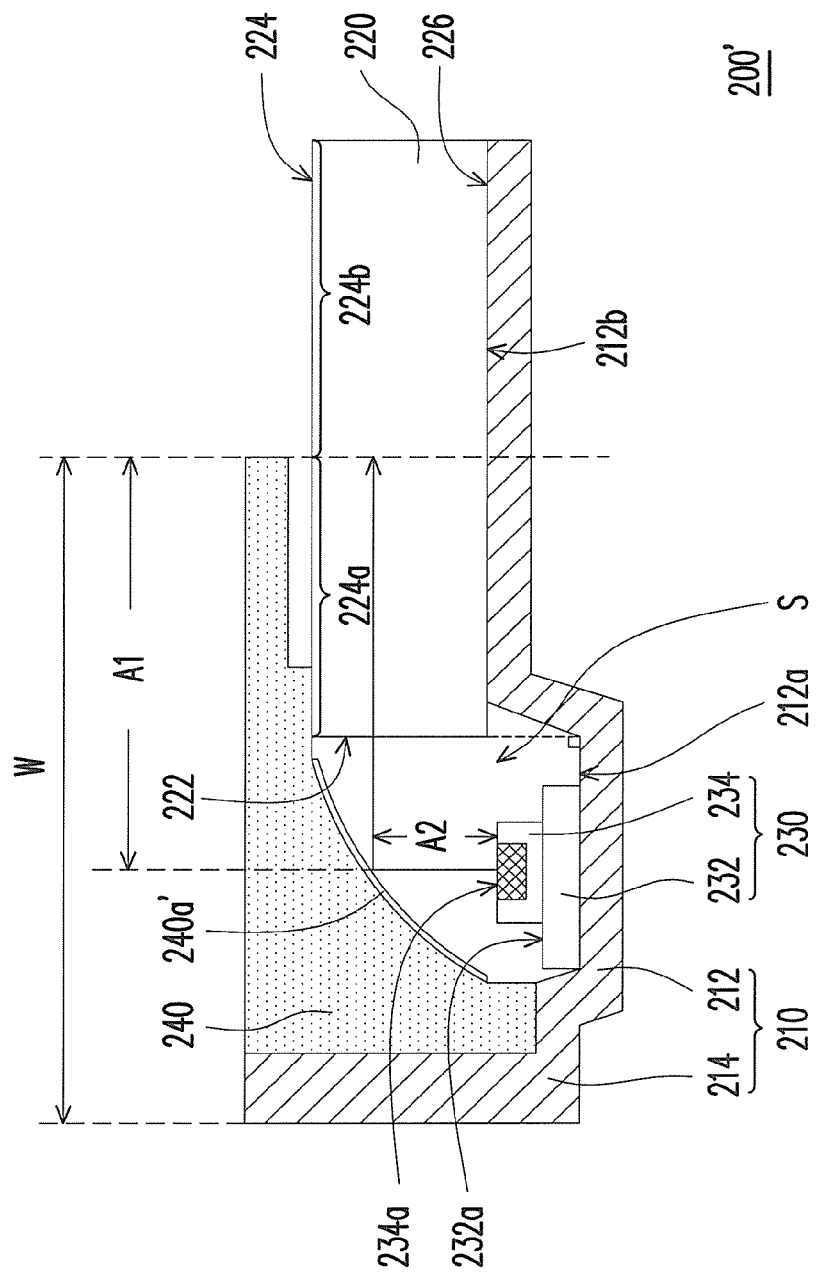
FIG. 4 is a schematic cross-sectional view illustrating an edge-type backlight module according to another embodiment of the invention.

FIG. 4 is a schematic cross-sectional view illustrating an edge-type backlight module according to another embodiment of the invention. With reference to FIG. 4, the edge-type backlight module 200' of this embodiment is similar to the edge-type backlight module 200 of the previous embodiment, while the main difference therebetween lies in that the reflective surface 240a' of the edge-type backlight module 200' in this embodiment is not a plane but a cambered surface. Similarly, the reflective surface 240a' is located on a transmission path of the light beam L to reflect the light beam L, and the reflected light beam L enters the LGP 220 from the light-incident side surface 222.

People having ordinary skill in the art can modify the materials, the shapes, the dimensions, the components, and the relative positions of the back bezel 210, the LGP 220, the light source 230, and the frame 240 without departing from the scope of the invention.

In this invention, the horizontal level of the light source supporting surface is lower than the horizontal level of the LGP supporting surface, so as to extend the shortest light path A from the light-incident surface of each of the LED devices to the edge of the effective illumination region. When the design concept of this invention is applied to the LCD with the slim border design, the requirement for the slim border design can be satisfied, and the A/P ratio can be effectively increased.

[Experimental Example]

In the following table, the A/P ratio of the conventional edge-type backlight module and the A/P ratio of the edge-type backlight module of the invention are compared, given the pitch P is 10 millimeters.

| Width W of Frame (mm) | 20 | 17 | 13 | 10 |
|---|---|---|---|---|
| A/P ratio of the conventional edge-type backlight module | 1.57 | 1.27 | 0.87 | 0.57 |
| A/P ratio of the edge-type backlight module of the invention (A2 = 4 mm) | 1.97 | 1.67 | 1.27 | 0.97 |
| A/P ratio of the edge-type backlight module of the invention (A2 = 6 mm) | 2.17 | 1.87 | 1.47 | 1.17 |

It can be observed from the above table that the A/P ratio is increased when the distance A2 is increased, and the hot spots are more unlikely to be formed. When the distance A2 is 4 millimeters, the invention is applicable to the LCD with the width W of 13 millimeters; when the distance A2 is 6 millimeters, the invention is applicable to the LCD with the width W of 10 millimeters. Apparently, when the distance A2 is greater than 6 millimeters, the invention is applicable to the LCD with the width W less than 10 millimeters.

It will be apparent to those skilled in the art that various modifications and variations can be made to the invention without departing from the scope or spirit of the invention. In view of the foregoing, it is intended that the invention cover modifications and variations of this invention provided they fall within the scope of the following claims and their equivalents.

What is claimed is:

1. An edge-type backlight module comprising:
   a back bezel comprising a supporting portion, the supporting portion having a light source supporting surface and a light guide plate supporting surface, wherein a horizontal level of the light source supporting surface is lower than a horizontal level of the light guide plate supporting surface;
   a light guide plate configured on the light guide plate supporting surface and having a light-incident side surface;
   a light source configured on the light source supporting surface to provide a light beam, wherein the back bezel has a portion that supports the light source, and the portion has the down-set design; and
   a frame configured on the back bezel and leaning against the light guide plate, the frame having a reflective surface located on a transmission path of the light beam to reflect the light beam, the reflected light beam entering the light guide plate from the light-incident side surface.

2. The edge-type backlight module as claimed in claim 1, wherein a difference between the horizontal level of the light source supporting surface and the horizontal level of the light guide plate supporting surface ranges from about 3 millimeters to about 10 millimeters.

3. The edge-type backlight module as claimed in claim 1, wherein the light guide plate further has a top light-emitting surface and a scattering surface opposite to the top light-emitting surface.

4. The edge-type backlight module as claimed in claim 3, wherein the horizontal level of the light guide plate supporting surface is between the horizontal level of the light source supporting surface and a horizontal level of the top light-emitting surface.

5. The edge-type backlight module as claimed in claim 1, wherein the light source comprises a light-emitting diode light bar.

6. The edge-type backlight module as claimed in claim 5, wherein the light-emitting diode light bar comprises:
   a circuit board configured on the light source supporting surface and having a device-mounting surface; and a plurality of light-emitting diode devices configured on the device-mounting surface, optical axes of the light-emitting diode devices pointing at the reflective surface.

7. The edge-type backlight module as claimed in claim 1, wherein an accommodation space is surrounded by the reflective surface of the frame, the light source supporting surface, and the light-incident side surface of the light guide plate, and the light source is located within the accommodation space and below the reflective surface.

8. The edge-type backlight module as claimed in claim 1, wherein the reflective surface is a plane or a cambered surface.

9. The edge-type backlight module as claimed in claim 1, wherein an included angle θ1 between the reflective surface and the light-incident side surface ranges from about 15° to about 75°.

10. The edge-type backlight module as claimed in claim 1, wherein an included angle θ2 between the reflective surface and the light source supporting surface ranges from about 15° to about 75°.

11. The edge-type backlight module as claimed in claim 1, wherein the light-incident side surface is substantially perpendicular to the light source supporting surface.

12. The edge-type backlight module as claimed in claim 1, wherein the back bezel further comprises a side leaning portion, the side leaning portion is connected to the supporting portion, and the frame leans against the side leaning portion of the back bezel.

* * * * *